Figure 1:
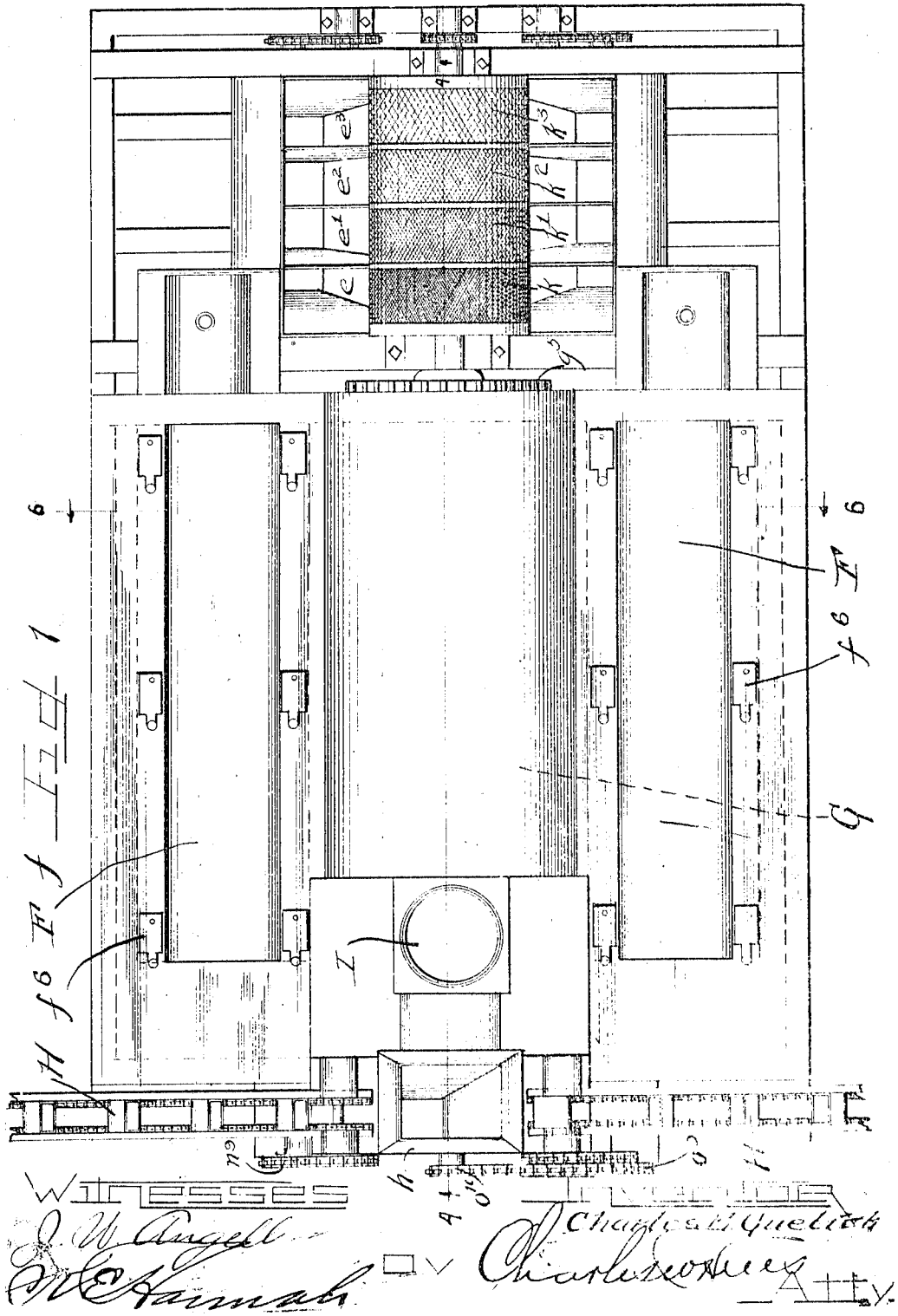

C. E. GUELICH.
PORTABLE MACHINE FOR TREATING ASPHALT, MASTIC, AND RELATED MATERIALS
APPLICATION FILED SEPT. 23, 1908.

1,117,561.

Patented Nov. 17, 1914.

8 SHEETS—SHEET 1.

C. E. GUELICH.
PORTABLE MACHINE FOR TREATING ASPHALT, MASTIC, AND RELATED MATERIALS.
APPLICATION FILED SEPT. 23, 1908.

1,117,561.

Patented Nov. 17, 1914.
2 SHEETS—SHEET 2.

C. E. GUELICH.
PORTABLE MACHINE FOR TREATING ASPHALT, MASTIC, AND RELATED MATERIALS.
APPLICATION FILED SEPT. 23, 1908.
1,117,561.
Patented Nov. 17, 1914
8 SHEETS—SHEET 3.
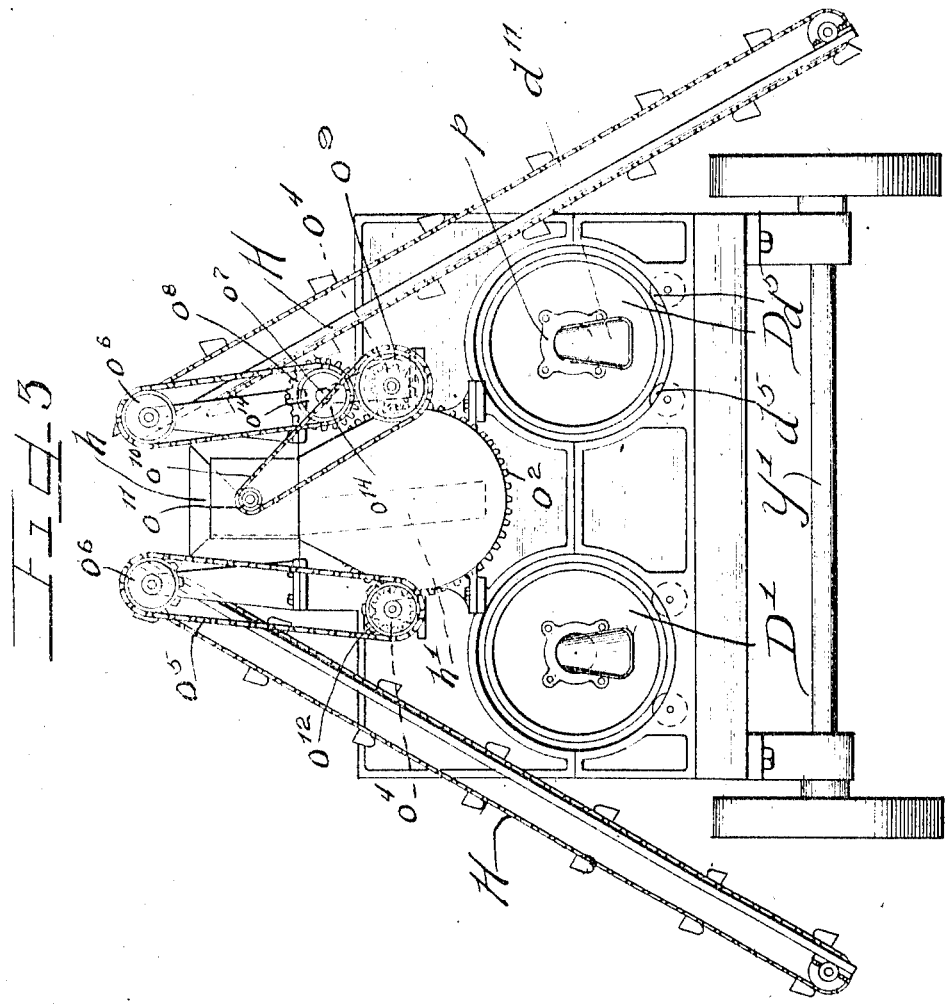

C. E. GUELICH.
PORTABLE MACHINE FOR TREATING ASPHALT, MASTIC, AND RELATED MATERIALS.
APPLICATION FILED SEPT. 23, 1908.
1,117,561.
Patented Nov. 17, 1914.
8 SHEETS—SHEET 4.
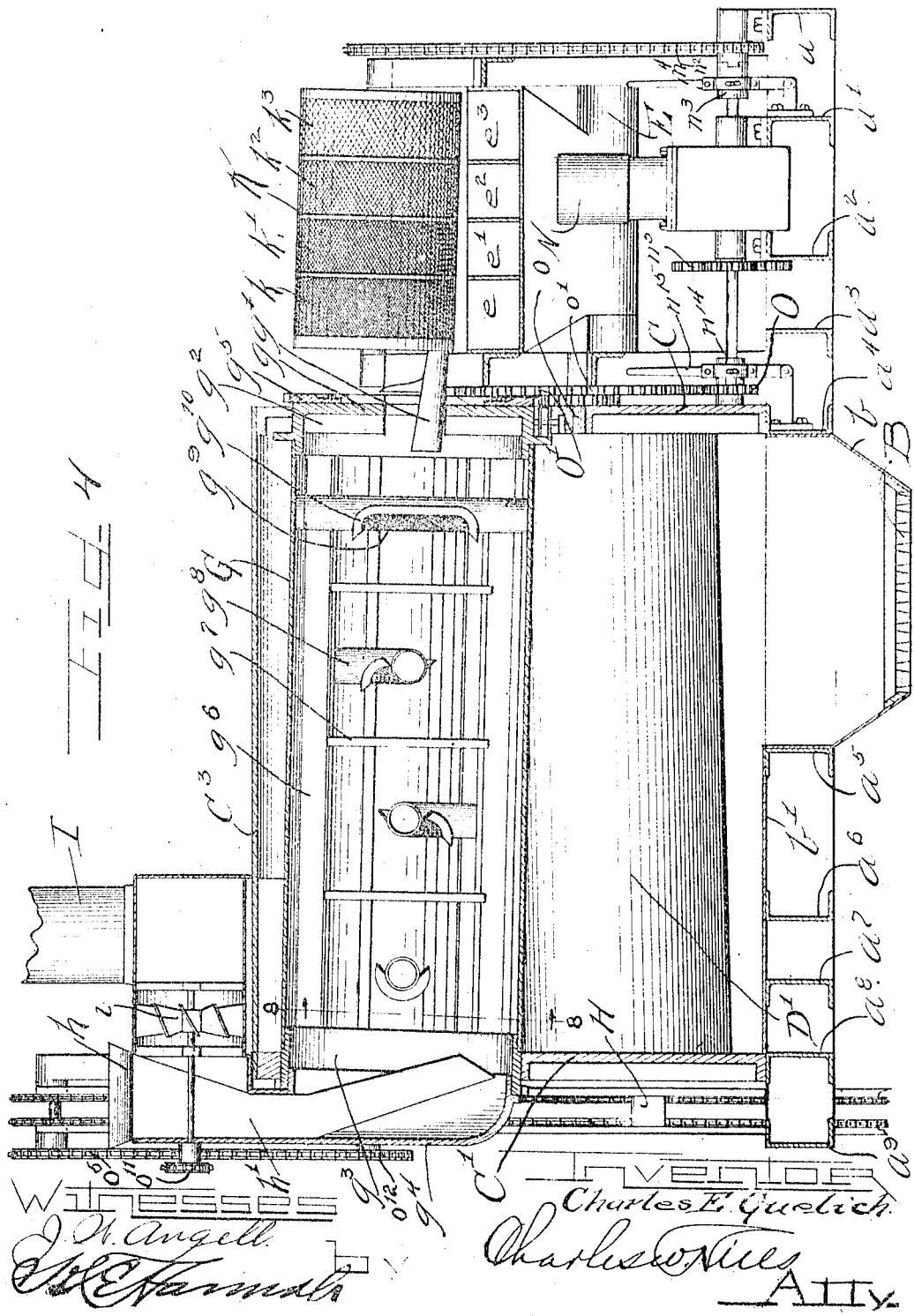

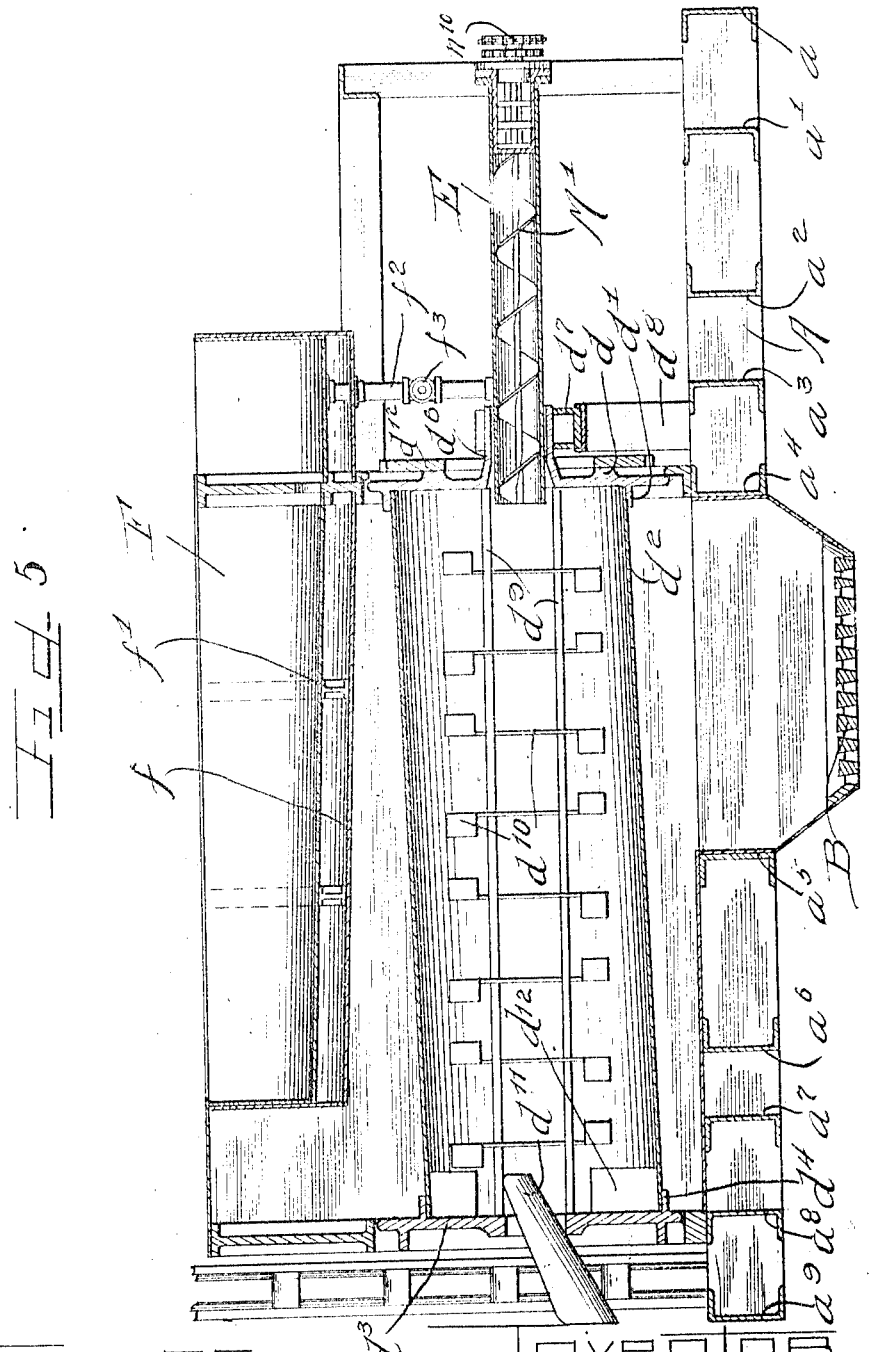

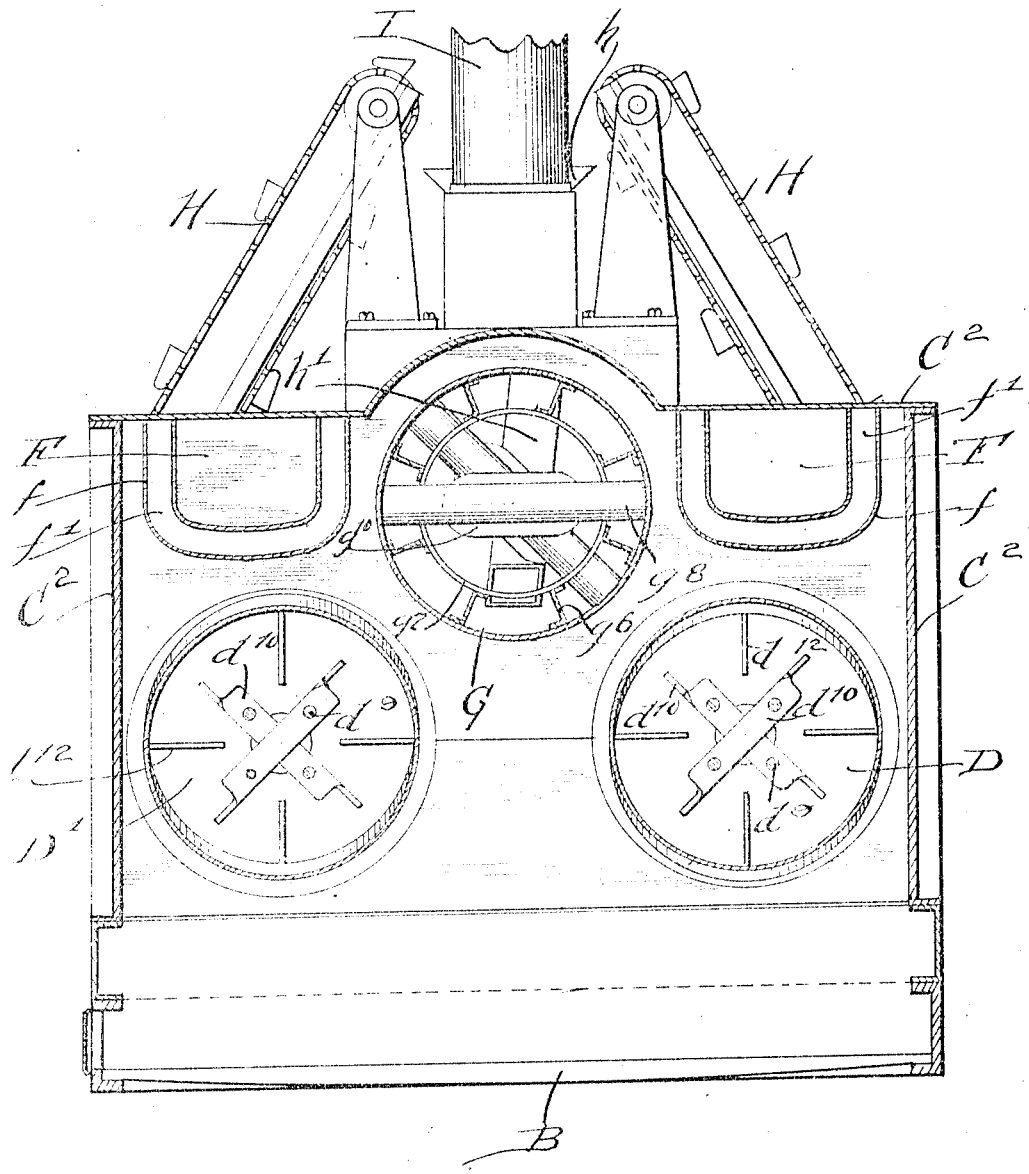

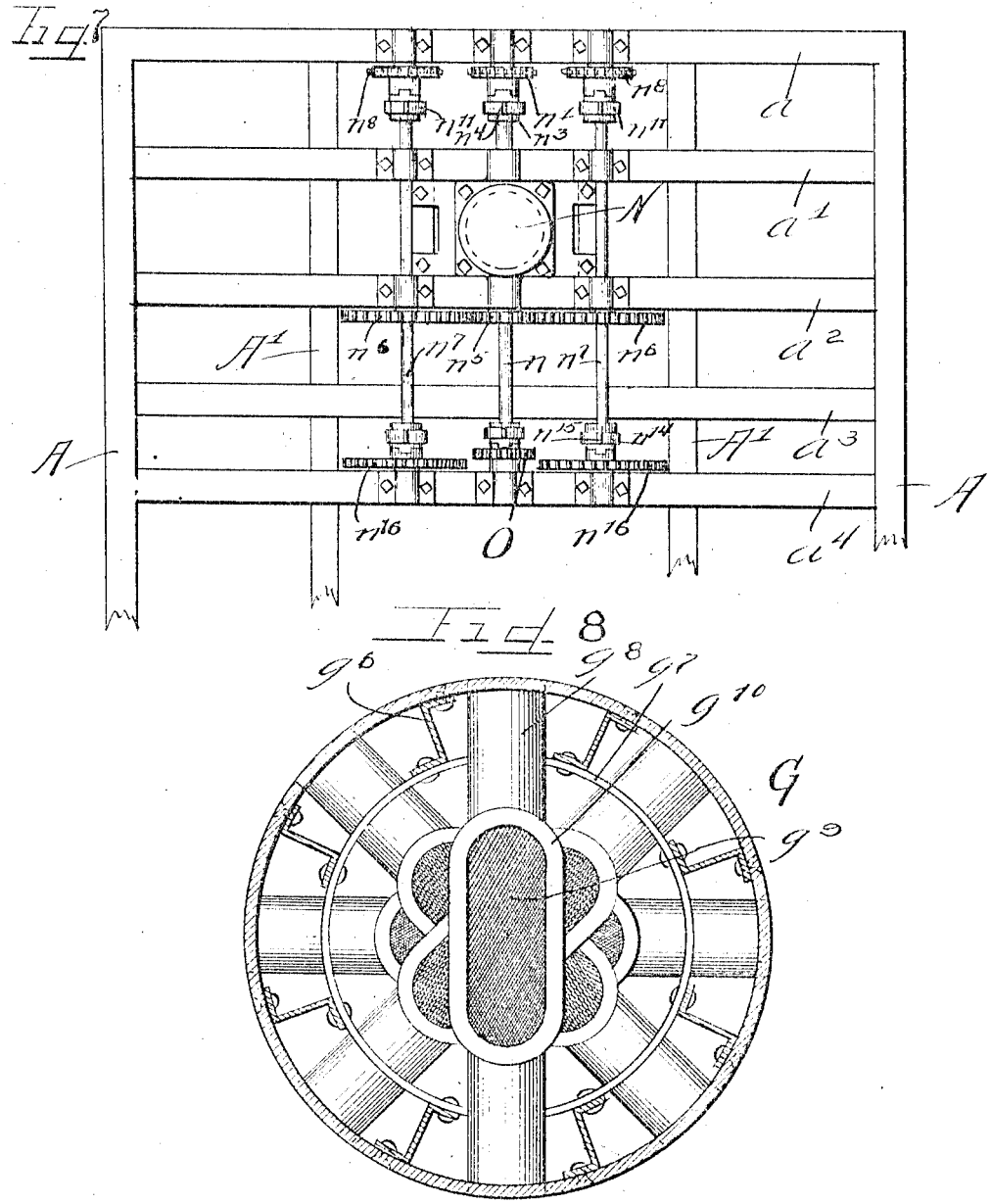

C. E. GUELICH.
PORTABLE MACHINE FOR TREATING ASPHALT, MASTIC, AND RELATED MATERIALS.
APPLICATION FILED SEPT. 23, 1908.
1,117,561. Patented Nov. 17, 1914.
8 SHEETS—SHEET 8.
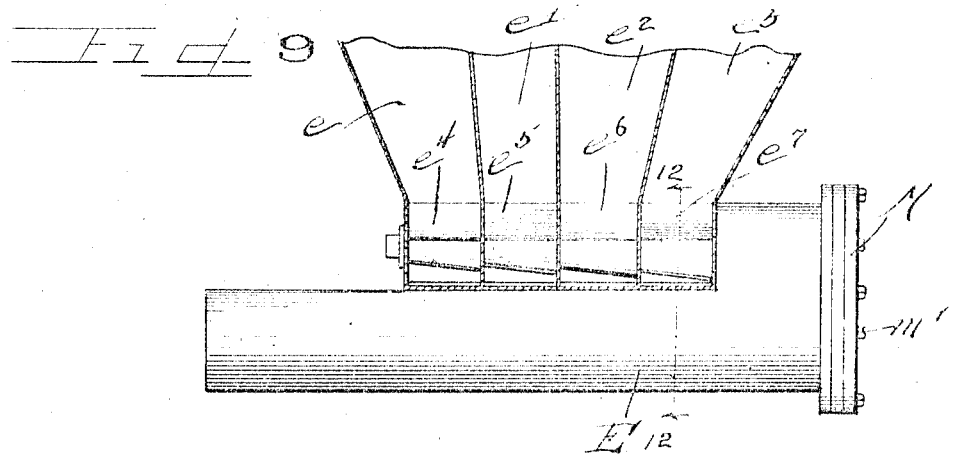
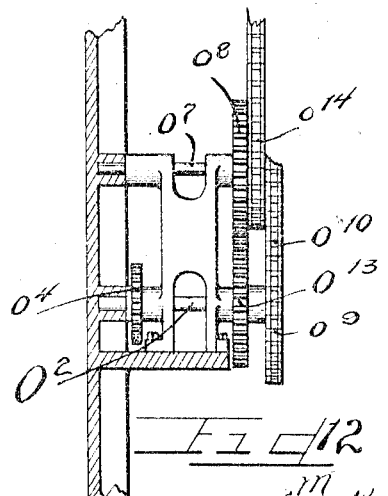
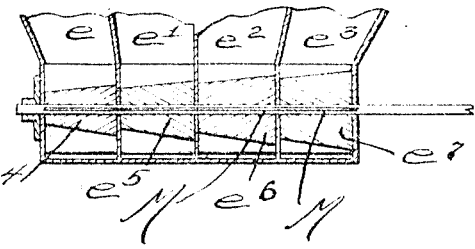
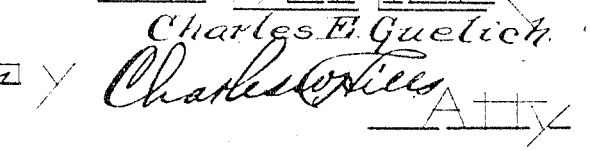

UNITED STATES PATENT OFFICE.

CHARLES E. GUELICH, OF CHICAGO, ILLINOIS.

PORTABLE MACHINE FOR TREATING ASPHALT, MASTIC, AND RELATED MATERIALS.

1,117,561.　　　　Specification of Letters Patent.　　Patented Nov. 17, 1914.

Application filed September 23, 1908. Serial No. 454,364.

*To all whom it may concern:*

Be it known that I, CHARLES E. GUELICH, a citizen of the United States, and a resident of the city of Chicago, Cook county, Illinois, have invented certain new and useful Improvements in Portable Machines for Treating Asphalt, Mastic, and Related Materials; and I do hereby declare that the following is a full, clear, and exact description of the same, reference being had to the accompanying drawings, and to the letters of reference marked thereon, which form a part of this specification.

This invention relates to that class of asphalt machines embraced in my prior application for patent, filed March 14, 1908, Serial No. 421,006, and in which a portable machine was provided with rotative cooking and mixing cylinders receiving the supply of asphalt cement from a suitable warming or heating caldron by means of a suitable feeder, and receiving simultaneously therewith and partly mixed therewith, sand and granular material such as crushed rock or gravel from a suitable drying compartment within the furnace, which is also mounted as a part of the machine. In said prior invention the machine was mainly intended for treatment of fresh or new materials of suitable fineness or graduated as to coarseness, the grading of which was controlled wholly or largely before the same was delivered into the machine.

In my present invention it is in part the object of the invention to provide a machine adapted to convert roads, pavements, or floors constructed of macadam, or of asphalt, into materials suitable for relaying by first treating the granular material in a revolving drying and heating drum, thence as it advances, delivering the same into the cooking and mixing cylinders, and then mixing the same with a quantity of fresh asphaltic cement or asphalt which has been previously used and by the action of the machine is converted into material suitable for relaying.

It is also an object of the invention to afford a cheap, simple and positively operating means for actuating the machine for delivering the materials thereinto and for subjecting the materials during their entire passage through the machine until delivered ready for relaying, to continuous heat, and to conserve the heat generated in the furnace to the fullest extent possible and to afford a progressive treatment of the material while subjected to heat adapted in the shortest possible time and in the most economical manner to restore said materials to their original condition preparatory to remixing for relaying.

The invention embraces many novel features and consists in the matters hereinafter described and more fully pointed out and defined in the appended claims.

Figure 2:
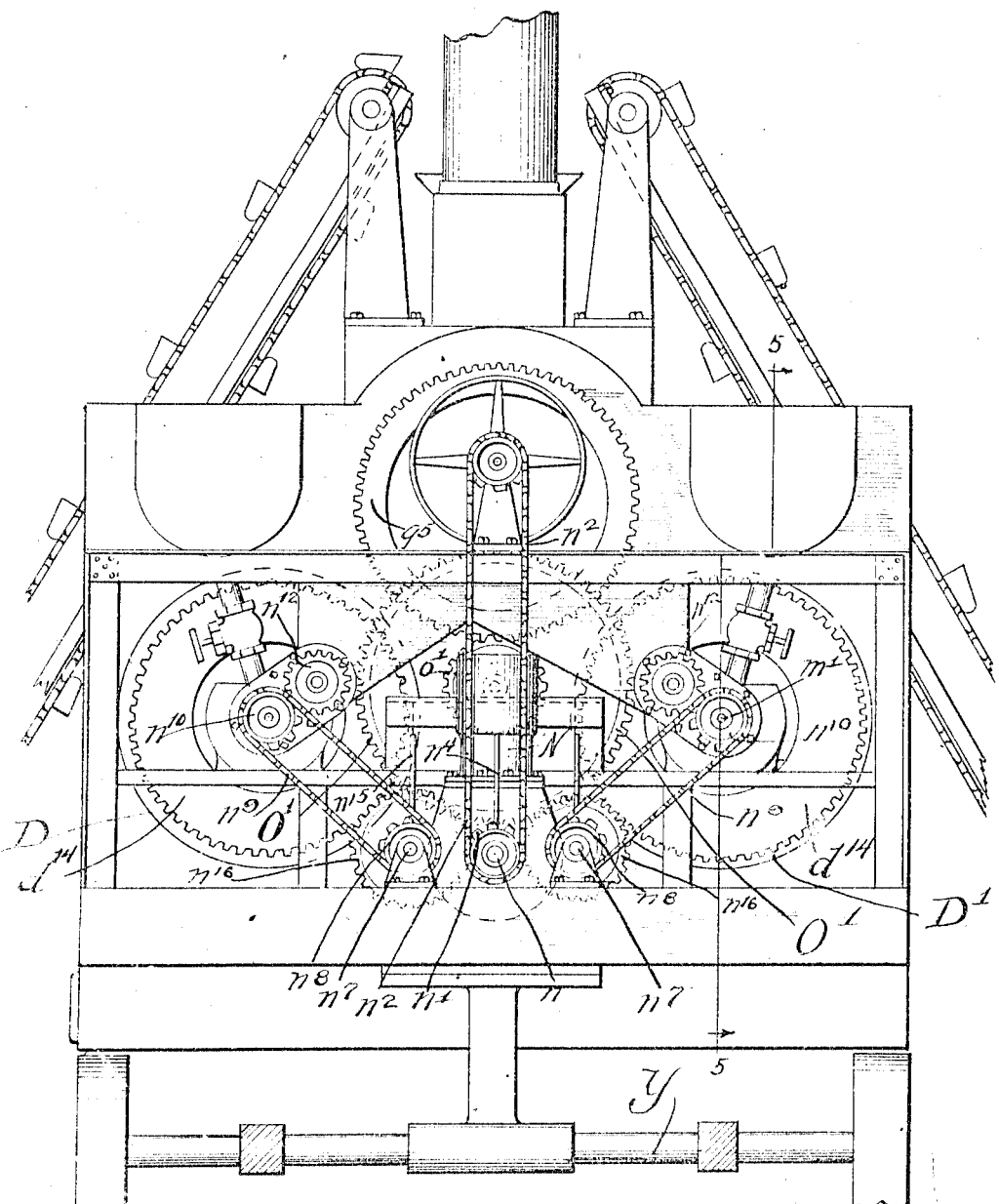

In the drawings: Figure 1 is a top plan view of a machine embodying my invention. Fig. 2 is a front elevation thereof. Fig. 3 is a rear elevation thereof. Fig. 4 is a section taken on line 4—4 of Fig. 1. Fig. 5 is a section taken on line 5—5 of Fig. 2. Fig. 6 is a section taken on line 6—6 of Fig. 1. Fig. 7 is a top plan view with parts omitted, of the driving end of the machine. Fig. 8 is a section on line 8—8 of Fig. 4. Fig. 9 is an enlarged vertical section of the multiple feed hopper showing the feeder in elevation. Fig. 10 is an enlarged fragmentary detail partly in section of the driving connections. Fig. 11 is a fragmentary front elevation showing the discharge end of the drying cylinder, with parts illustrated in dotted lines. Fig. 12 is a section on line 12—12 of Fig. 9. Fig. 13 is a vertical section taken through the measuring valves in the hoppers.

As shown in the drawings: Said machine is constructed on a frame consisting of suitable structural bars forming side sills A, end sills $a$—$a^9$, and transverse sills $a'$ to $a^8$ inclusive, of which the transverse sills $a^2$—$a^3$—$a^6$—$a^7$ are disposed suitably to afford the bolster sills above any suitable truck on which the frame may be supported. The transverse sills $a^4$—$a^5$ are channels having their flanges turned away from each other, and are a suitable distance apart to afford a part of the side walls of the furnace, the grate bars B of which are supported on inclined plates $b$, riveted or otherwise secured to the backs of the channels. Disposed parallel to the side sills A, and extending from the transverse sills $a$ to $a^9$ and suitably engaged between adjacent sills, are center sills A', which may be constructed in any suitable manner with reference to the transverse sills engaged either below the same or constructed in sections between the same, as may be preferred. The sills $a^5$ to $a^8$ inclusive are covered on the upper side with plates of metal $b'$, as shown in Fig. 4, to afford a floor for the furnace, and supported upon the sills $a^4$—$a^5$, are the end walls of the machine, which serve also for the end walls of the furnace, and which, as shown, are composed of suitable cast iron plates, which may be arranged sectionally or otherwise and in any suitable form for use in association with the parts hereinafter described. As shown also, side plates $O^2$, are provided supported upon the side sills and also constructed of suitably shaped cast sections adapted to afford a closed wall and which may be constructed in any desired form or configuration to adapt the same to the other parts or mechanisms which afford a part of the machine. Rotatably engaged on each side of the middle of the furnace thus formed, are cooking cylinders indicated by D—D'. These, as shown, each comprise a cast iron or other suitable head $d$, at the forward end of the machine, which, as shown, is circular in form, and is provided on the inner side with a circular flange $d'$, arranged eccentrically thereon, as shown in Fig. 5, and in which fits the forward end of the rearwardly inclined cylinder shell $d^2$. The rear head $d^3$, is likewise circular in form, and provided with a circular flange $d^4$, corresponding with that before described on the head $d$. Said shell $d^2$ fits within said flange, said heads being arranged with reference to each other so that the axes of said circular heads extend obliquely across the axis of the shell, in other words, the opposite ends of said shell are arranged eccentrically with, and on opposite sides of an axis connecting said heads, so that as the cylinder revolves, its ends also oscillate or gyrate about a center so that first one end is more elevated than the other followed by a reversal in which the other end is more elevated. As shown, the rear head of each of said cylinders is supported upon rollers or castings $d^5$, two in number, to facilitate the rotation thereof, and each forward head is provided with a forwardly directed, tubular hub $d^6$, journaled in a suitable bearing $d^7$, supported on a post $d^8$, on said frame. Inserted into said tubular hub and delivering into the cylinder therethrough, is the feeder, indicated as a whole by E, and hereafter more fully described. Within the cylinder as shown, are provided beaters, which are rigidly fixed on the heads, and as shown, comprise longitudinal rods $d^9$, four in number, as shown in Figs. 5 and 6, and extending diametrically across the cylinder and engaged on oppositely disposed rods, are paddles or beaters $d^{10}$, the ends of which extend to near the periphery of the cylinder. Any desired number of such beaters may be used. As shown, a discharge spout or chute $d^{11}$, is adapted to be inserted through the central aperture in the pipe head to catch the material delivered thereto from the radial shelves or blades $d^{12}$, and which act to elevate said material to permit the same to slide thence into the chute.

As shown, the top of the furnace is covered with metal plates $O^3$, and fixed to the underside thereof are two melting caldrons, each comprising as shown, a trough F, constructed of sheet metal and inclined toward the forward end of the machine, and as shown, jacketed by an outer shell $f$, spaced from the inner by means of peripheral ribs or webs $f'$, in the present instance shown as I beams or bars bent to a suitable curvature. Each caldron is adapted to discharge into the corresponding feeder through a pipe $f^2$, provided with a valve $f^3$, and which opens into the corresponding feeder, as shown in Fig. 5, and from whence the melted material in plastic form is fed into the cylinder.

Journaled centrally in the top of the furnace between the melting caldrons and the cooking cylinders is the drying receptacle, in this instance shown as a rotatable cylinder G, and which, as shown, is provided at its front end with a rotative head $g$, having a central aperture therethrough to receive the discharge chute $g'$, and provided within the head with integral radial blades $g^2$, corresponding with the radial plates $g^{12}$ before described in the mixing cylinder and useful for the same purpose. The cylinder G, is connected with said head by riveting or otherwise. Said cylinder, as shown, at its rear end is secured upon an annular band or rim $g^3$, affording an open end therefor and projects into a breeching $g^4$. On the front head of the cylinder is provided a spur gear $g^5$, whereby the cylinder may be rotated and as shown, said cylinder may be supported at both ends as heretofore described with reference to the rear end of the heating cylinders, that is to say, suitable rollers or casters may be provided at each end to take the weight of the cylinder as the same rotates. Supported on each side of the machine as shown in Figs. 2 and 3, are elevators H, in this instance, shown as bucket elevators, though, of course, other types may be used if preferred. Said elevators are adapted to receive the material such as macadam or any granular material adapted for use in the preparation of a road, floor or pavement it is purposed to construct, and serve to elevate the same and empty the contents of the buckets into the hopper $h$, the lower end $h'$ of which is directed downwardly through the bridging and inwardly to the cylinder, as shown in Fig. 4, so that the material from said conveyers is discharged directly into the drying cylinder. As shown, said cylinder is provided within the same with longitudinal ribs consisting of Z bars $g^6$, riveted to the shell G, and projecting inwardly with the inner flanges directed toward the direction of rotation of the cylinder. As shown also, bands or rims $g^7$ are riveted or otherwise secured on the inner flanges of the Z bars, as shown in Figs. 6 and 8, and serve to brace the same on the rim, and extending through the cylinder shell G diametrically are flues $g^8$, each of which, as shown, is formed of sheet metal and is cut away on the rear side thereof affording a relatively large opening extending longitudinally of the pipe or flue and partly closed by means of wire gauze $g^9$, about which, and secured to the flue, is a deflector plate or rib $g^{10}$, which projects outwardly from the flue and serves to prevent the material within the cylinder from falling against the gauze.

Mounted upon the rear end of the machine, and opening into a suitable chamber connected with the breeching $g^4$ is a stack I, and means are provided for affording a draft through the stack comprising a positively driven fan $i$, the shaft of which extends through the breeching $g^4$ and is provided with a sprocket wheel $o''$.

Journaled on the forward end of the machine is a screen K, as shown consisting of a drum of suitable length divided longitudinally into a plurality of sections graduated in fineness from the comparatively fine rear end of the drum into which the material from the drier is delivered to the comparatively coarse screen at the forward end of the drum, said drum being inclined forwardly and downwardly so that the material moves by gravity toward the front or coarser screen, and as shown, the spout or chute $g'$, whereby the material is delivered from the drying cylinder, projects into position to discharge into the screen.

As shown in Figs. 1, 4 and 9, a hopper, affording compartments $e$—$e'$—$e^2$—$e^3$, each below the corresponding screen section $k$—$k'$—$k^2$—$k^3$, of the drum and each provided with a rotative measuring valve in its bottom, receives the material from the various sections and delivers the same graduated as to fineness into said respective compartments grading the same so that the compartment $e$ contains the finest material and the compartment $e^3$ the coarsest. The rotative measuring valve, as shown, comprises a shaft M, journaled axially in a suitable casing in the bottom of said hopper, and extending transversely through each of said compartments and secured on said shaft in the respective compartments, are the individual valve portions before mentioned, which are constructed similarly each to the other except that the valve from the fine compartment $e$, is adapted to deliver the material more rapidly from the compartment than the valve for the coarser compartments. For this purpose, as shown, the closure for the valve comprises a head having tangentially directed blades $m$, each of which is adapted to bear against the walls of the casing as the head rotates, and between which and the blade in advance thereof is afforded a pocket, the depth of which, of course, determines the quantity of material to be delivered with each rotation of the shaft. Delivering downwardly from said hopper through said valve, the material falls into the feeder proper, which consists of the casing E, before mentioned, containing a worm conveyer M'. This worm conveyer projects through the tubular axial bearing $d^6$ for the forward head of the corresponding cooking and mixing drum and projects inwardly beyond the head sufficiently to deliver the material well into the drum. Connected also in the casing E, is the valved pipe $f^2$, before described which delivers the contents of the melting caldron so that the materials are delivered and partly mixed in the feeder and then delivered into the heating drum in a homogeneous mass.

The various mechanisms hereinbefore described may, of course, be driven simultaneously from any suitable source of power and either one or more motors may be employed for the purpose. However, as shown, a single motor (and that an internal combustion engine N), is supported on the forward end of the frame and drives a main shaft $n$, provided at its forward end with a sprocket wheel $n'$, adapted to receive the sprocket chain $n^2$, trained over the sprocket wheel on the screen shaft before described. As shown in Fig. 4, a shifting clutch $n^3$, is provided operated by a lever $n^4$, whereby the screens may be thrown out of action by the shifting of the clutch.

At the rear of the engine and on the motor shaft, is provided a spur gear $n^5$, which acts in lieu of a balance wheel and which drives two corresponding gears $n^6$, on shafts $n^7$, one of which is located on each side of the main shaft $n$, and as shown, is also provided at its forward end with a sprocket wheel $n^8$, adapted to receive the sprocket chain $n^9$, which is trained over the sprocket wheel $n^{10}$, on the shaft of the worm conveyer M'. As shown also, a clutch $m^{11}$, operated by a suitable lever is provided on each of said shafts whereby either of the conveyer shafts may be thrown out of action and its driving shaft permitted to rotate freely. As shown, the measuring valves are rotated from the conveyer shaft of the feeder, for this purpose spur gears $n^{12}$, being provided on the valve shafts and corresponding spur gears on the conveyer shafts intermeshing, as shown in Fig. 2. Each of the shafts $n^7$, is provided at its rear end with a spur gear.

Rotatably secured on each of the shafts $n^7$, at the rear end thereof and controlled by a clutch $n^{14}$, operated by a lever $n^{15}$, is a gear $n^{16}$. These gears mesh respectively with the gear $g^{14}$, on the forward end or head of each of the mixing and cooking cylinders, thereby rotating the cooking cylinders from the motor and rotating either both simultaneously or rotating them selectively, it being possible to operate either independently of the other or both simultaneously, as preferred. Also rotatably secured on the driving shaft $n$, is a pinion O, which drives a gear O', journaled upon a stud shaft $o$, in the main frame of the furnace and rigidly secured on said gear O', is a pinion $o'$, which meshes with the gear $g^5$ on the forward end of the drying cylinder. Said shaft is provided with a clutch $n^{14}$ and lever $n^{15}$, as before described adapting the drying cylinder being actuated either independently, or simultaneously with the mixing and cooking cylinders and the screen. At the rear end of the drying cylinder is rigidly secured a geared ring $o^2$, whereby the power of the motor is transferred through the medium of said rotating and drying cylinder to the rear end of the machine. Meshing with said geared ring, as shown more fully in Fig. 3, are spur gears $o^4$, one on each side the drying cylinder, and rigidly secured upon a shaft $o^3$, on one side of the machine is a sprocket wheel $o^{12}$, and a sprocket chain $o^5$, is trained over said sprocket wheel $o^{12}$, and the sprocket wheel $o^6$, for the lateral conveyer H. Of course, the drive from the forward to the rear end of the machine may be arranged in numerous ways and both said conveyers, may, if preferred, be driven direct from a sprocket wheel on the shaft with the directly driven spur gear $o^4$. As shown, the other of said conveyers is driven from a sprocket wheel $o^{14}$, on a shaft $o^7$, rotated by the spur gear $o^8$, which meshes with a spur gear $o^{13}$ (see Fig. 10) on the same shaft with the spur gear $o^4$, before described. With this arrangement the sprocket wheel $o^9$, is connected by means of a sprocket chain $o^{10}$, with a sprocket wheel $o^{11}$, on the fan shaft, thus driving the fan continuously to create a draft.

The operation is as follows: The machine is, of course, mounted upon any suitable trucks, of which the front trucks Y, are provided with any suitable fifth wheel to enable the machine to be readily steered or the direction changed when drawing the same from place to place, and at the rear end, as shown in Fig. 3, is the supporting truck Y'. In operation, the heat from the fire pot passes upwardly through the furnace and around the mixing and cooking drums or cylinders and thence around the drying cylinder and the caldrons, and thence its heat having been utilized to the maximum degree the products of combustion are delivered outwardly through the stack. The asphaltic cement or like material is delivered into the caldrons in any suitable manner. The heat applied in the caldrons may be graduated by removing one or more of the cover plates $f^5$, which vent the air space between the outer and inner walls of the caldron and thus, by permitting a greater or less amount of circulation between the walls enables the heat transmitted to the caldron to be easily graduated. While so treating the asphaltic materials to be melted, the granular material, which may be, of course, fresh and new material or if preferred, when the machine is used for road repair the worn out roadbed of macadam or like material is delivered into the bucket conveyers H, at the rear end of the machine, and is carried upwardly and dumped into the hopper, from whence it is delivered into the drying cylinder, mainly by gravity, and owing to the forward inclination of the drying cylinder and the rotation thereof, said material is carried therethrough each rotation thereof carrying the material upward on the Z bars, or inwardly directed, longitudinal webs in the cylinder from whence the material falls past the screen flue pipes, being thus constantly thrown into the hot current of air passing from the flues and falling from the top to the bottom of the cylinder effectually breaking up any of the unbroken lumps of the material while the same is exposed to a high degree of heat, thereby thoroughly separating and breaking up the materials and effectually drying the same, and thence delivering the material through the various divisions of the screen into the hopper compartments effectually graded as to fineness. The material is now admitted into the feeder by means of the rotative valve, the bottoms in which in the various compartments are graduated to deliver of each grade of material the proper proportion to insure the most satisfactory results, and this material mixed with the melted asphalt or similar material is delivered in a partly mixed condition into the appropriate cooking and mixing cylinder. Here, owing to the eccentric journaling of said cylinders, which causes the ends each to have a slight orbital movement each eccentric to the other, the material is thrown back and forth from end to end of the cylinder as the cylinder rotates and is dashed in contact with the mixing blades supported in the respective cylinders with the effect that all portions of the contents of the cylinders are equally heated and equally mixed, and inasmuch as the rotation of the cylinder constantly brings a surface of higher temperature into contact with the material being treated, it follows that the material is very quickly raised to maximum heat or cooked and that without danger of burning. Having completed the cooking operation, the chute $d^{11}$, is inserted into the rear end of the cylinder, which is normally closed by means of a suitable cover plate secured by means of bolts extending into the raised central portion $p$, of the head. Having removed the cover plate, and inserted the chute, continued rotation of the cylinder carries the material upwardly on the blades $d^{12}$, from whence the material drops into the chute and is delivered from the machine.

Of course, I am aware that in my prior application for patent the drying means, the caldron and the cooking and mixing means were wholly within the furnace. In that construction, however, the drying means were stationary and for that reason were not well suited to break up and thoroughly grade the materials designed for re-use. Neither was the screen construction well adapted for the grading of materials delivered from the drying bins. Such grading had therefore to be performed manually before the materials were delivered into the machine.

I have embodied in this invention mechanism for automatically drying and separating the constituents into their parts and grading the granular constituents in accordance with the finest preparatory to re-combining the materials for re-laying.

Of course, very numerous details of the construction may be varied. I therefore do not purpose limiting myself otherwise than necessitated by the prior art.

I claim as my invention:

1. In a machine of the class described, the combination with a furnace, of a rotative drying cylinder inclosed therein, fire flues extending transversely through and opening into the cylinder and adapted to deliver a hot blast through the material when falling from the top to the bottom of the cylinder, a grading screen adapted to receive the material from the cylinder, independent compartments for receiving the graded material, and simultaneously operating rotative measuring valves for discharging measured quantities from the compartments.

2. In a portable machine of the class described, the combination with a furnace, of a rotative drying cylinder inclosed therein, fire flues extending transversely through and opening into the cylinder and adapted to deliver a hot blast through the material when falling from the top to the bottom thereof, a rotative grading screen comprising a plurality of sections of different mesh and adapted to receive the material from the cylinder, a bin below each section of the screen to receive the graded material, and a melting caldron on each side of the drying cylinder.

3. In a portable machine of the class described, a furnace, a rotative cylinder inclosed therein, a hopper adapted to deliver the material to be treated into one end of said cylinder, fire flues opening into the cylinder, a rotative grading screen positioned to receive the discharge at the opposite end of the cylinder, bins below the same for the different grades of material, a rotative measuring feeder to deliver the material therefrom, a caldron on each side of the cylinder, and an eccentrically journaled mixing cylinder for each caldron.

4. In a machine of the class described, a drying cylinder, a caldron on each side thereof, an oscillating mixing cylinder beneath each caldron, independent feeding mechanism for delivering material from each of the caldrons and the drying cylinder into its mixing cylinder, and means adapted to operate either of the mixing cylinders independently of the other.

5. In a machine of the class described, a furnace, a rotative cylinder inclosed therein, a hopper adapted to deliver material to be treated into one end thereof, elevators operated from the rotation of the cylinder and delivering into the hopper, fire flues extending diametrically through the cylinder and opening therein, rotative grading screens in axial alinement with and at the discharge end of the cylinder, and bins positioned below the screens.

6. A furnace, cooking and mixing cylinders in the furnace, a drying cylinder for granular material between said mixing cylinders and slightly above the same, a caldron above each mixing cylinder, a feeder acting to deliver said materials to the cooking and mixing cylinders, and means adapted to operate either of the mixing cylinders independently of the other.

7. In a machine of the class described, the combination with a furnace, of a rotative drying cylinder wholly inclosed therein, caldrons set into the furnace, a rotative and oscillating cooking and mixing cylinder below each caldron, a feeder operated partly by gravity for delivering the contents of the drying cylinder and caldrons thereinto, and means adapted to operate the mixing cylinders independently of each other.

8. In a machine of the class described, a furnace, caldrons, a movable drying receptacle inclosed therein, fire flues extending diametrically through the drying receptacle and opening thereinto, an automatic feeder receiving the contents thereof, and cooking compartments in the furnace adapted to receive the discharge of the feeder.

9. In a machine of the class described, the combination with a furnace, of a drying receptacle, a caldron on each side of said drying receptacle, a cooking receptacle beneath each caldron, means for rotating two of said elements independently of the others, and a feeder acting to deliver the material from both said drying receptacle and said caldrons into the cooking receptacles.

10. In a machine of the class described, a furnace, a rotatable drying and disintegrating cylinder therein inclined toward the front of the machine, a caldron on each side of said cylinder and inclining toward the front of the machine, and a rotatable mixing cylinder beneath each caldron and inclining oppositely from said drying cylinder.

11. In a machine of the class described, a furnace, a rotatable drying and disintegrating cylinder therein inclined toward the front of the machine, fire flues extending therethrough and opening thereinto, caldrons one on each side of the cylinder and inclining toward the front of the machine, rotatable mixing cylinders inclining oppositely from the drying cylinder, and independent feeders delivering the material from each of the caldrons into its respective mixing cylinder through its axis.

12. In a machine of the class described, a furnace, a plurality of sets of cooking receptacles and caldrons therein, a feeder affording communication between each receptacle and its caldron, a single drying cylinder between the sets of receptacles and caldrons, a grading screen adapted to receive the material from said cylinder, independent hoppers receiving the material from said screen, and rotating measuring valves for discharging measured quantities from said hoppers into said feeders.

13. In a machine of the class described, the combination with a portable furnace, of a rotative drying cylinder inclosed therein, a melting caldron on each side of the drying cylinder, a rotatable cooking and mixing cylinder beneath each caldron, a rotative grading screen adapted to receive the material from the drying cylinder and consisting of sections of various fineness, a hopper beneath each section adapted to receive material of that grade therein, measuring valves in the bottoms of said hoppers adapted to deliver graduated amounts of said material therefrom, and means for delivering the melted material to automatic feeders adapted to deliver the material from said hoppers mixed with the melted material into said cooking and mixing cylinders.

14. The combination with a housing, of a furnace in the bottom thereof, a rotative mixing and cooking cylinder journaled above the furnace, a rotative drying cylinder journaled above the cooking cylinder and partly to one side thereof, fire flues leading through said drying cylinder to a place of discharge, and a melting caldron seated in the top of the housing above the cooking cylinder and screened by both of said cylinders from the direct heat of the furnace.

15. In a machine of the class described, the combination with a furnace, of an inclined rotative drying cylinder inclosed therein, a jacketed melting caldron on each side of the drying cylinder, a rotative and oscillating cooking and mixing cylinder beneath each caldron, a sectional grading screen adapted to receive the material from the drying cylinder, a separate hopper beneath each section adapted to receive material of that grade therein, means adapted to deliver graduated amounts of said material therefrom, and means for delivering the melted material to automatic feeders adapted to deliver the material from said hoppers, mixed with the proper proportion of the melted material from the caldrons, into said cooking and mixing cylinders.

16. In a machine of the class described, a rotative drying and disintegrating cylinder, a rotative screen in alinement therewith and adapted to receive the material therefrom, and consisting of longitudinally arranged sections of various fineness, a hopper beneath each section, each hopper adapted to receive material of but one grade or fineness, and automatic simultaneously-acting rotating valves for delivering measured quantities of material from each hopper.

17. In a machine of the class described, a rotative drying and supporting cylinder, a rotative screen adapted to receive the material therefrom and consisting of longitudinally arranged sections of various fineness, a bin beneath each section each adapted to receive material of but one grade or fineness, a feeder adapted to receive the material from said bin, and rotating valves having pockets therein to automatically deliver measured quantities of the material to the feeder.

18. The combination with drying means, of rotative cylinder screens divided longitudinally into screen sections of varying coarseness, a hopper or bin beneath each screen section adapted to receive the material of that grade only, simultaneously acting measuring valves in the bottoms of said compartments adapted to deliver graduated amounts of said material therefrom, a cooking and mixing cylinder, and an automatic feeder adapted to deliver the material from said hoppers into said cylinder.

19. The combination with drying means, and a caldron for asphalt, of a rotative cylinder screen divided longitudinally into screen sections of varying coarseness, a hopper compartment beneath each screen section adapted to receive the material of that grade therein, simultaneously acting measuring valves in the bottom of said compartments adapted to deliver graduated amounts of said material therefrom, a cooking and mixing cylinder, and means for delivering the asphaltic cement from said caldron to an automatic feeder adapted to deliver the material from said hoppers mixed with the asphaltic cement into said cylinder.

20. The combination with a furnace, of a caldron for asphalt and drying means therein, rotative cylinder screens divided longitudinally into screen sections of varying coarseness, a hopper or bin beneath each screen section adapted to receive the material of that grade therein, simultaneously-acting measuring valves in the bottoms of said bins adapted to deliver graduated amounts of said material therefrom, a cooking and mixing cylinder, and an automatic power feeder adapted to receive the material from said bins and from said caldron and to deliver the same into said cooking and mixing cylinder.

In testimony whereof I have hereunto subscribed my name in the presence of two subscribing witnesses.

CHARLES E. GUELICH.

Witnesses:
K. E. HANNAH,
LAWRENCE REIBSTEIN.